Feb. 25, 1936.　　　C. A. GUSTAFSON　　　2,032,088
ROAD MACHINE
Filed Dec. 7, 1932　　　2 Sheets-Sheet 1
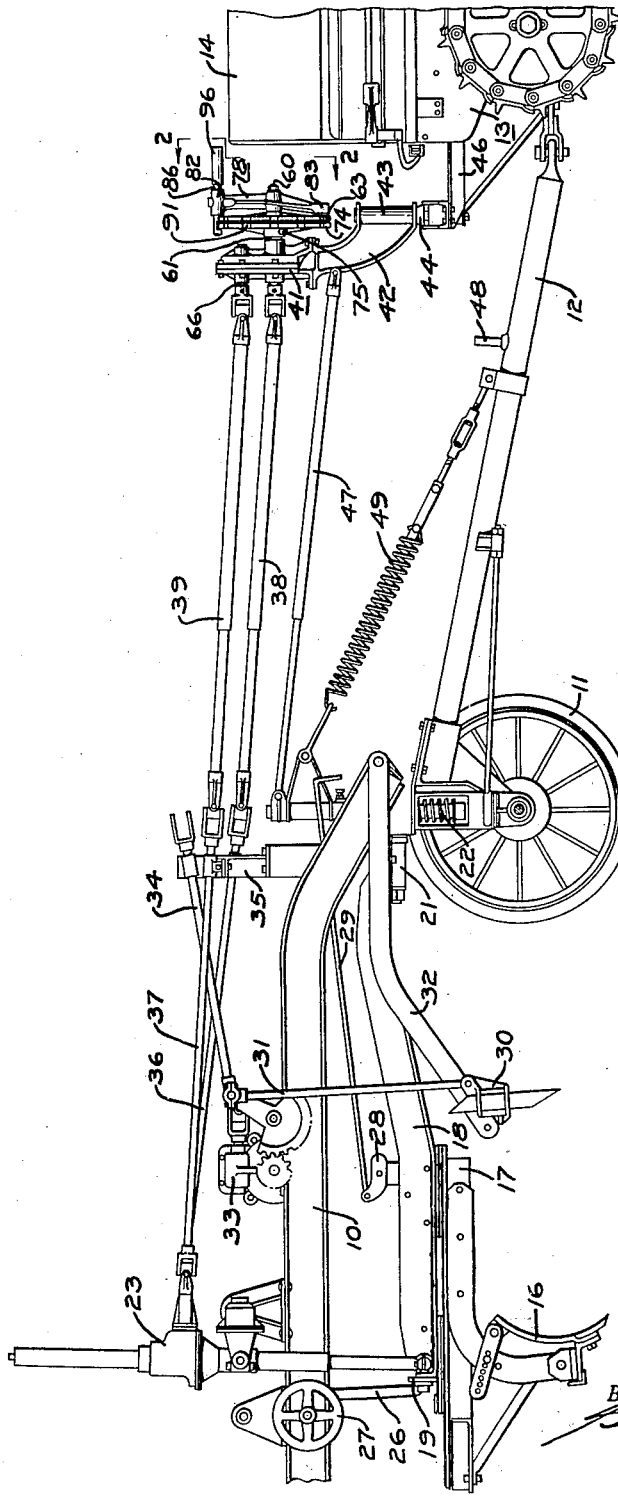
INVENTOR.
Carl A. Gustafson
BY
ATTORNEY.

Feb. 25, 1936. C. A. GUSTAFSON 2,032,088
ROAD MACHINE
Filed Dec. 7, 1932 2 Sheets-Sheet 2
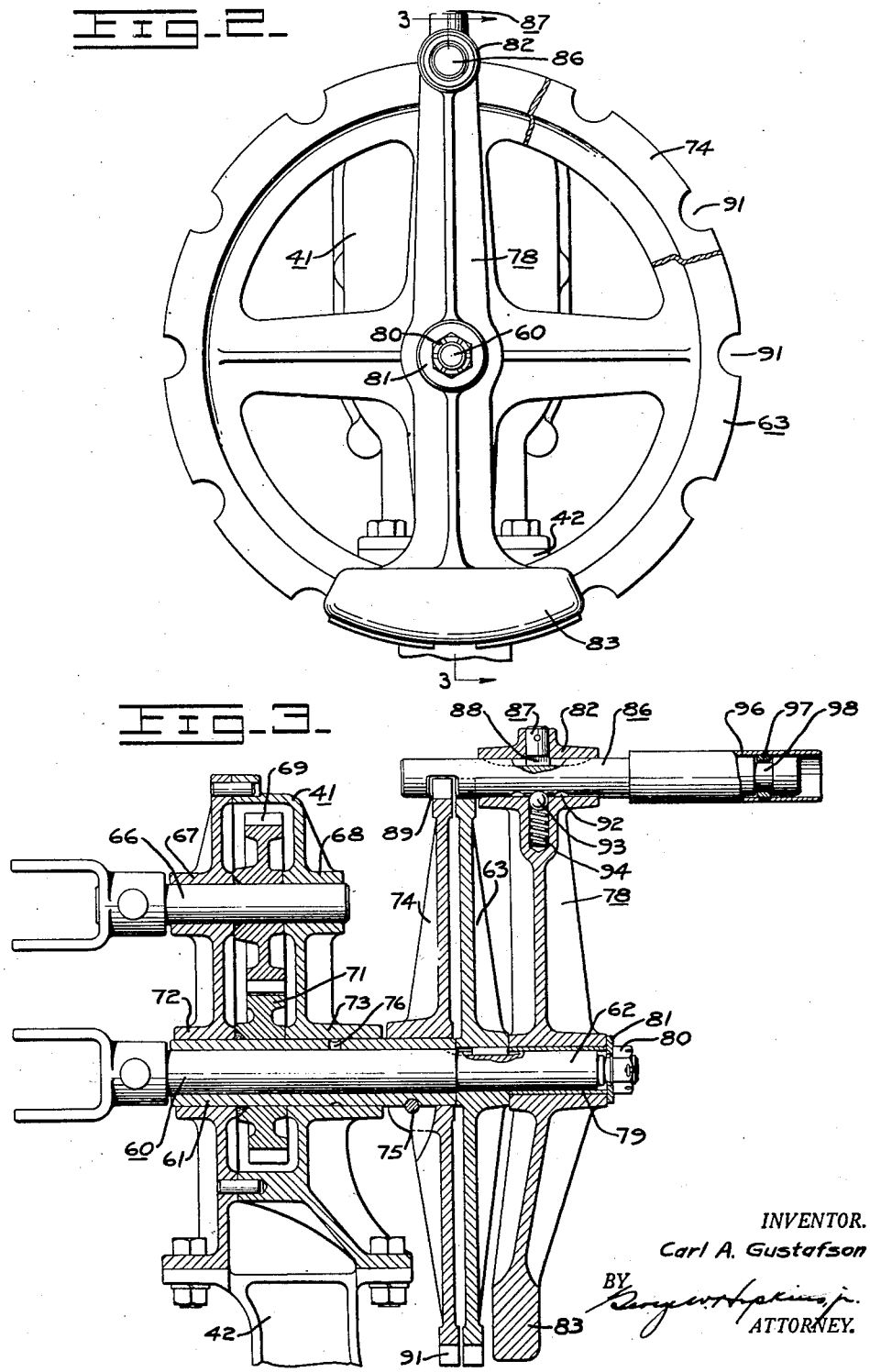
INVENTOR.
Carl A. Gustafson
BY
ATTORNEY.

Patented Feb. 25, 1936

2,032,088

UNITED STATES PATENT OFFICE 2,032,088

ROAD MACHINE

Carl A. Gustafson, Peoria, Ill., assignor to Caterpillar Tractor Co., San Leandro, Calif., a corporation of California Application December 7, 1932, Serial No. 646,047

29 Claims. (Cl. 37—153)

The present invention relates to road machines and particularly to selective clutch means for controlling the tool adjusting mechanism thereof.

In the selective clutch control means heretofore known, clutch gearing is used and usually includes a broad gear which is shiftable to engage either or both of a pair of offset gears on the drive shafts for the control mechanism. Such clutch gearing requires accurate machining and the provision of a comparatively complicated gear box construction. The selective clutch control means disclosed herein eliminates entirely the use of clutch gearing and provides a simplified selective clutch means which is easily manufactured and does not require extremely accurate work. This simplified structure not only reduces the cost of manufacture and assembly, but is so constructed that it is visible to the operator so that the clutch mechanism can be watched while in operation. This feature lends itself to quicker and easier adjustment of the clutch means thereby insuring more constant control of the adjustment of the tool and consequent improvement in work.

It is an object of the invention to provide a simple and reliable selective clutch control mechanism for the tool adjusting mechanism of a road machine.

Another object of the invention is to provide a road machine having a selective clutch control means whereby either or both of a plurality of tool adjusting mechanisms can be operated from a single operating member.

Another object of the invention is to provide a road machine having a selective clutch control means for the tool adjusting mechanisms thereof which eliminates the use of clutch gearing.

Another object of the invention is to provide a road machine having a selective clutch control means for the tool adjusting mechanisms thereof which is entirely visible to the operator.

Other objects will appear as the description progresses.

Description of figures

Fig. 1 is a partial side elevation of a road machine embodying the invention.

Fig. 2 is a front elevation of the selective clutch control means taken on the line 2—2 in Fig. 1.

Fig. 3 is a section on line 3—3 in Fig. 2.

Description of the machine

The road working apparatus which is disclosed herein as embodying the instant invention includes a trailer grader having a frame 10 which is provided with front supporting wheels 11 and rear supporting wheels (not shown). The grader is drawn through tractor pole 12 from track-type tractor 13 having side seat arrangement 14, providing an operator's station from which the operator can observe and control the operation of the tractor and the grader.

A plurality of earth-engaging tools are mounted adjustably on the frame of the grader. Blade 16 is adjustably supported from circle 17 which is revolubly supported in a frame including drawbars 18, and rear cross member 19. Drawbars 18 are provided with a suitable draft connection 21 with king-bolt 22, which provides a pivotal connection between the front wheel assembly and the frame. Similar telescopic lift hangers 23, only one of which is seen in Fig. 1, are universally mounted on each side of the frame and are universally connected at their lower ends to rear cross member 19 adjacent the ends thereof. Said hangers provide means for adjusting the blade vertically. Link 26 and hand wheel 27 form part of the means for adjusting the blade transversely with respect to the frame. As stated above, circle 17 is mounted revolubly in its supporting frame whereby the angle of the blade with respect to the line of draft can be varied. The blade is maintained in its angular adjustment by circle locking mechanism 28 operated by rod 29 extending forwardly therefrom.

From the foregoing description it is seen that the blade is adjustable vertically at either end, is adjustable transversely with respect to the frame, and is adjustable angularly with respect to the line of draft. The desired position of the blade is obtained usually by a combination of these adjustments.

Scarifier 30 is supported by lift links 31, one of which is seen in Fig. 1, and opposite drawbars 32 provide a draft connection therefor. Said lift links 31 are operated from gearing in housing 33 which, in turn, is operated by shaft 34 supported at its forward end in bracket 35. Said bracket 35 also serves to support the forward ends of shafts 36, 37, which serve to operate telescopic lift hangers 23.

For a more detailed disclosure of the above mechanisms reference is hereby made to my copending application Serial No. 449,206, filed May 2, 1930.

The blade and scarifier adjusting mechanisms are adapted to be operated by a selectively operable control means adjacent the operator's station on the tractor.

As shown in Fig. 1, shafts 36, 37 are universally connected to telescopic shafts 38, 39, which are universally connected at their front ends to a selective clutch control means described more specifically hereinafter. Housing 41 forms a part of this control means and said housing is supported on bracket 42 having vertical cylindrical portion 43 pivotally engaging pin 44 on bracket 46. Said bracket 46 forms a rearward extension from tractor 13. Bracket 42 has aligning connection 47 with king-bolt 22 which serves to maintain the control means adjacent the operator. When the road machine is not in use, the selective clutch control means is lifted from pin 44 on the tractor and placed on pin 48 on the tractor pole which is supported from king-bolt 22 by spring connection 49.

As shown in Fig. 1, the selective clutch control means is adapted to operate the telescopic lift hangers for the blade. If the scarifier is to be operated, shaft 39 is disconnected from shaft 37 and connected to shaft 34.

The selective clutch control means for operating the adjusting mechanisms for the blade or the scarifier includes two driven trains either or both of which are operable from a single driving member. The driven trains are provided with coaxial portions including a plurality of nested shafts to obtain a simple and compact construction. One of these driven trains includes shaft 60 journaled in sleeve 61 in said housing 41, and having reduced forward portion 62 to which clutch disk 63 is keyed. Said clutch disk 63 is adapted to be engaged by the driving clutch element in a manner hereinafter described to transmit a drive through shaft 60 and shaft 38 (Fig. 1) universally connected to the tool adjusting mechanism.

The second driven train includes shaft 66 journaled in bosses 67, 68, in housing 41 and having gear 69 welded thereon. Gear 69 meshes with gear 71 welded on said sleeve 61 which is journaled in bosses 72, 73, in said housing 41. Clutch disk 74 is clamped on the forward end of said sleeve 61 by means of clamping bolt 75 and is adapted to be driven by the driving clutch element in a manner hereinafter described to drive sleeve 61, gears 71 and 69, shaft 66 and shaft 37 or 34 to operate the tool adjusting mechanism. In lubricating the above described driven trains, lubricant is originally placed in housing 41 for shaft 66, gears 69, 71, and sleeve 61. Said sleeve 61 has peripheral groove 76 having a passage communicating with the bearing surface of shaft 60.

The driving clutch element includes crank 78 journaled on bushing 79 on shaft 62 and held thereon by nut 80 threaded on the reduced end of said shaft and engaging washer 81. The hub of crank 78 engages the hub of clutch disk 63 to hold said disk in place.

Apertured boss 82 is provided at one end of said crank and counterweight 83 is provided at the other end to counterbalance said crank to facilitate operation of the clutching mechanism. Clutch pin 86 is slidably and non-rotatably mounted in boss 82 and is adapted to be positioned in any one of three positions to selectively engage the clutch disks. It is to be noted that clutch pin 86 is located radially of crank 78 so that the center line of said pin is aligned substantially with the peripheries of clutch disks 63, 74. Stud 87 is pinned in boss 82 and is provided with lug 88 engaging a longitudinal groove in said pin 86 which is therefore slidable longitudinally in said boss 82 but is not rotatable with respect thereto. Spaced from its rear end and on the under side, said pin 86 is notched at 89, the depth and width of said notch being such that the outer periphery of either of disks 63 or 74 can pass freely therethrough. The solid portions of pin 86 on either side of said notch 89 are adapted to engage in spaced notches 91 forming clutching stations in said disks 63, 74 to provide a driving connection from pin 86 to either or both of said disks.

Said pin 86, as shown in Fig. 3, has driving engagement with disk 63, notch 89 being aligned with said disk 74. Should said pin 86 be shifted to the right, notch 89 becomes aligned with disk 63 while disk 74 has driving engagement with said pin 86. If said pin 86 be shifted to the left from the position shown in Fig. 3, said notch 89 is out of alignment with both said disks 63, 74, and pin 86 therefore has driving engagement with both disks. Thus it is seen that pin 86 is shiftable to three active positions, providing a selective clutch control for driving one or more of a plurality of tool adjusting mechanisms.

Means are provided for maintaining the shiftable clutch control element resiliently in its adjusted position. On the bottom side thereof, said pin 86 is provided with three spaced transverse grooves 92 which are adapted to be engaged by ball 93 under the influence of spring 94 seated in said crank 78. Notches 92 and spring-pressed ball 93 serve to resist movement of pin 86 from adjusted position and to accurately position said pin in its selected position.

Said pin 86 is manually shiftable to control operation of the tool adjusting mechanisms, and a handle is rotatably mounted thereon. Said handle comprises sleeve 96 having internal ring 97 welded thereto, said ring 97 being held on reduced forward end 98 of said pin 86 by a suitable screw threaded therein.

Operation

With clutch pin 86 in the position shown in Fig. 3, notch 89 is aligned with disk 74 and said pin has operative engagement with disk 63, and upon rotation of crank 78 in either direction, said clutch pin serves to rotate clutch disk 63, shaft 60, and shaft 38 (Fig. 1) connected thereto to operate one of the tool adjusting mechanisms. When clutch pin 86 is shifted to the right from the position shown in Fig. 3, notch 89 is aligned with clutch disk 63 and said pin 86 is operatively engaged with clutch disk 74, and, upon rotation of crank 78 in either direction, serves to rotate said disk 74, sleeve or hollow shaft 61, gears 71, 69, shaft 66, and shaft 39 (Fig. 1) connected thereto to operate the other of the tool adjusting mechanisms. When clutch pin 86 is shifted to the left from the position shown in Fig. 3, notch 89 is not aligned with either of said clutch disks, both of which are operatively engaged with said clutch pin. In this position both of the above noted trains of mechanism are operated upon rotation of crank 78 in either direction to operate a plurality of tool adjusting mechanisms, shafts 60 and 66 always rotating in opposite directions.

From the foregoing description, it is seen that a selective clutch control means is provided by the instant invention which is of a simple and reliable structure and can be economically manufactured and assembled easily. It is to be noted that the use of clutch gearing is entirely eliminated by the invention in issue, the selective clutch means being visible at all times to the operator and located conveniently adjacent the operator's station on the tractor.

I, therefore, claim as my invention:

1. In a road machine, a frame, an earth-engaging tool adjustably mounted on said frame, adjusting mechanisms for said tool, and selective control means for said adjusting mechanisms comprising a housing, a sleeve mounted in aligned bosses in said housing and extending therethrough, a gear fixed on said sleeve, a shaft mounted in a second pair of aligned bosses in said housing and extending therethrough oppositely to said sleeve, a second gear fixed on said shaft and meshing with said first gear, a second shaft journaled in said sleeve and extending therethrough at both ends, connections from the adjacent ends of said shafts to said adjusting mechanisms, a clutch disk mounted on the extending end of said sleeve and having a notched outer periphery, a second clutch disk mounted on said second shaft adjacent the extending end of said sleeve and having a notched outer periphery, a crank rotatably mounted on the extending end of said second shaft adjacent said second disk, a pin slidably and non-rotatably mounted in an apertured boss formed in an end of said crank, said pin being located radially of said crank so that the center line thereof is aligned substantially with the peripheries of said disks and having a notch formed therein adapted to be aligned with one of said disks to permit relative movement thereof with respect to said pin, an adjacent portion of said pin being positioned in a peripheral notch of the other of said disks to establish a driving engagement therebetween, and a spring-pressed ball mounted in said crank and adapted to engage said pin to maintain it resiliently in adjusted position.

2. In a road machine, a frame, an earth-engaging tool adjustably mounted on said frame, adjusting mechanisms for said tool, and selective control means for said adjusting mechanisms comprising a housing, a sleeve mounted in aligned bosses in said housing and extending therethrough, a gear fixed on said sleeve, a shaft mounted in a second pair of aligned bosses in said housing and extending therethrough oppositely to said sleeve, a second gear fixed on said shaft and meshing with said first gear, a second shaft journaled in said sleeve and extending therethrough at both ends, connections from the adjacent ends of said shafts to said adjusting mechanisms, a clutch disk mounted on the extending end of said sleeve and having a notched outer periphery, a second clutch disk mounted on said second shaft adjacent the extending end of said sleeve and having a notched outer periphery, a crank rotatably mounted on the extending end of said second shaft adjacent said second disk, and a pin slidably and non-rotatably mounted in an apertured boss formed in an end of said crank, said pin being located radially of said crank so that the center line thereof is aligned substantially with the peripheries of said disks and having a notch formed therein adapted to be aligned with one of said disks to permit relative movement thereof with respect to said pin, an adjacent portion of said pin being positioned in a peripheral notch of the other of said disks to establish a driving engagement therebetween.

3. In a control mechanism for adjusting the earth moving means of a road machine, a plurality of axially aligned movable clutch elements, a control clutch element engageable with one or more of said movable clutch elements, and means mounting said control element for translational rotation about an axis aligned with the axes of said movable clutch elements.

4. In a control mechanism for adjusting the earth moving means of a road machine, a plurality of nested shafts, a plurality of movable clutch elements mounted on said shafts, and a control clutch element rotatably mounted on one of said shafts and selectively engageable with said movable clutch elements, comprising a counterbalanced crank.

5. In a control mechanism for adjusting the earth moving means of a road machine, a hollow shaft, a second shaft extending through said hollow shaft, a disk on said hollow shaft having clutching stations formed in the periphery thereof, a second disk on said second shaft having clutching stations formed in the periphery thereof, a driving member rotatably mounted on one of said shafts, and a control clutch element mounted in said member and shiftable laterally with respect thereto to engage the clutch stations in said disks simultaneously or independently.

6. In a control mechanism for adjusting the earth moving means of a road machine, a hollow shaft, a second shaft extending through said hollow shaft, a disk on said hollow shaft having clutching stations formed in the periphery thereof, a second disk on said second shaft having clutching stations formed in the periphery thereof, a driving member rotatably mounted on one of said shafts, a control clutch element mounted in said member and shiftable laterally with respect thereto to engage the clutch stations in said disks simultaneously or independently, and means for resiliently maintaining said element in any shifted position thereof.

7. In a control mechanism for adjusting the earth moving means of a road machine, a hollow shaft, a second shaft extending through said hollow shaft, a disk on said hollow shaft having clutching stations formed in the periphery thereof, a second disk on said second shaft having clutching stations formed in the periphery thereof, a driving member rotatably mounted on one of said shafts, and a control clutch element mounted on said member and shiftable laterally with respect thereto, said element having a notched portion adjacent one end whereby said element is adapted for free rotation about a clutch disk aligned with said portion.

8. In a control mechanism for adjusting the earth moving means of a road machine, a hollow shaft, a second shaft extending through said hollow shaft, a disk on said hollow shaft having clutching stations formed in the periphery thereof, a second disk on said second shaft having clutching stations formed in the periphery thereof, a driving member rotatably mounted on one of said shafts, a control clutch element mounted on said member and shiftable laterally with respect thereto, said element having a notched portion at one end whereby said element is adapted for free rotation about a clutch disk aligned with said portion, and a peripherally recessed portion at the other end, and a sleeve rotatably mounted on said element and having a portion extending within said recessed portion.

9. In a road machine, an earth-engaging tool, adjusting mechanisms for said tool, and selective control means for said adjusting mechanisms including a hollow shaft, a second shaft journaled in said hollow shaft, connections from said shafts to said adjusting mechanisms, a disk mounted on said hollow shaft having spaced clutching stations formed in the periphery thereof, a second disk mounted on said second shaft having spaced clutching stations formed in the outer periphery thereof, an operating member rotatably mounted on one of said shafts, and a shiftable element mounted on said member and engageable independently and simultaneously with the clutching stations on said disks.

10. In a road machine, an earth-engaging tool, adjusting mechanisms for said tool, and selective control means for said adjusting mechanisms including a hollow shaft, a second shaft journaled in said hollow shaft, connections from said shafts to said adjusting mechanisms, a disk mounted on said hollow shaft having spaced clutching stations formed in the periphery thereof, a second disk mounted on said second shaft having spaced clutching stations formed in the outer periphery thereof, an operating member rotatably mounted on one of said shafts, a shiftable element mounted on said member and engageable independently and simultaneously with the clutching stations on said disks, and resilient means for maintaining said element in shifted position with respect to said member.

11. In a road machine, an earth-engaging tool, adjusting mechanisms for said tool, and selective control means for said adjusting mechanisms including a hollow shaft, a second shaft journaled in said hollow shaft, connections from said shafts to said adjusting mechanisms, a disk mounted on said hollow shaft having peripheral notches, a second disk mounted on said second shaft having peripheral notches, a crank rotatably mounted on one of said shafts, and means for simultaneously and independently establishing a driving engagement between said crank and said disks.

12. In a road machine, an earth-engaging tool, adjusting mechanisms therefor, and means for operating said adjusting mechanisms comprising a plurality of axially aligned rotatably mounted members, one of said members forming a driving element, the others of said members forming driven elements, and means for selectively connecting said members to establish a driving connection from said one of said members to any one or more of said others of said members.

13. In a road machine, an earth-engaging tool, adjusting mechanisms therefor, and means for operating said adjusting mechanisms comprising a plurality of axially aligned rotatably mounted members, one of said members forming a driving element, the others of said members forming driven elements, and means for selectively connecting said members, comprising a shiftable element mounted on the driving element.

14. In a road machine, an earth-engaging tool, adjusting mechanisms therefor, and means for operating said adjusting mechanisms comprising a plurality of axially aligned rotatably mounted members, one of said members forming a driving element, the others of said members forming driven elements, and means for selectively connecting said members, comprising a shiftable element mounted on the driving element, said driving element comprising a counter-balanced crank.

15. In a road machine, an earth-engaging tool, adjusting mechanisms therefor, and means for operating said adjusting mechanisms comprising a plurality of axially aligned rotatably mounted members, one of said members forming a driving element, the others of said members being mounted in juxtaposed relation at one side of said driving element and forming driven elements, and means for selectively connecting said members adjacent their peripheries.

16. In a road machine, an earth-engaging tool, adjusting mechanisms therefor, and means for operating said adjusting mechanisms comprising a plurality of axially aligned rotatably mounted members, one of said members forming a driving element, the others of said members forming driven elements, and means for selectively connecting said members adjacent their peripheries, comprising a laterally shiftable pin having an end portion for engaging said driven elements and an end portion for mounting a handle.

17. In a control mechanism for adjusting the earth moving means of a road machine, a plurality of axially aligned movable clutch elements, including a driving element and driven elements, and a control-clutch element movable with said driving element and engageable with one or more of said driven elements.

18. In a control mechanism for adjusting the earth moving means of a road machine, a plurality of axially aligned movable clutch elements, a control clutch element engageable with one or more of said movable clutch elements, and an arm mounting said control clutch element for rotation about an axis coincident with the axes of said movable clutch elements.

19. In a road machine, an earth-engaging tool, adjusting mechanisms therefor, and means for operating said adjusting mechanisms comprising a plurality of axially aligned rotatably mounted members, one of said members forming a driving element, the others of said members forming driven elements, and means for selectively connecting said one of said members to any one or more of said others of said members including a shiftable member mounted adjacent the periphery of said one of said members.

20. In a control mechanism for adjusting the earth moving means of a road machine, a plurality of shafts adapted for connection to adjusting mechanisms, and clutch mechanism for operating said shafts including a plurality of axially aligned disks having clutching stations formed in the peripheries thereof, and a driving member rotatably mounted in axial alignment with said disks and engageable selectively with any one or more of said disks through the clutching stations thereon to operate the adjusting mechanisms.

21. In a control mechanism for adjusting the earth moving means of a road machine, a plurality of shafts, and clutch means associated with said shafts to control selective operation thereof including a driving member comprising a counter-balanced crank.

22. In a control mechanism for adjusting the earth moving means of a road machine, a plurality of shafts, clutch disks connected to said shafts having clutching stations formed in the peripheries thereof, a driving member rotatably mounted in axial alignment with said disks, and a clutch control element movably mounted on said driving member and formed to provide for free rotation about a selected clutch disk while having driving engagement with another of said clutch disks.

23. In a road machine, an earth-engaging tool, adjusting mechanisms for said tool, and selective control means for said adjusting mechanisms including shafts connected to said adjusting mechanisms, axially aligned disks connected to said shafts, each disk having clutching stations formed in the periphery thereof, and an operating member rotatably mounted in axial alignment with said disks and engageable independently and simultaneously with the clutching stations on said disks.

24. In a road machine, an earth-engaging tool, adjusting mechanisms for said tool, and selective control means for said adjusting mechanisms including shafts connected to said adjusting mechanisms, axially aligned disks connected to said shafts, each disk having clutching stations formed in the periphery thereof, an operating member rotatably mounted in axial alignment with said disks, shiftable means mounted on said member and engageable independently and simultaneously with the clutching stations on said disks, and means for maintaining said shiftable means in any shifted position thereof.

25. In a control mechanism for adjusting the earth moving means of a road machine, a housing, a plurality of shafts mounted in said housing and extending exteriorly thereof, a gear connection in said housing consisting of non-shiftable intermeshed gears, and a clutch mechanism mounted exteriorly of said housing for operating said shafts, comprising clutch disks having clutching stations formed in the periphery thereof, and an operating member engageable independently and simultaneously with the clutching stations of the respective clutch disks.

26. In a road machine, a tool, an operator's station, adjusting mechanisms for said tool and manually operable control means for said adjusting mechanisms adjacent said operator's station comprising a plurality of relatively large clutch disks, and an operating member therefor having an element shiftable selectively to determine independent and simultaneous operation of said adjusting mechanisms, said disks, said member and said element being visible to the operator to facilitate manipulation thereof in controlling and operating said adjusting mechanisms.

27. In a road working apparatus; a tractor having an operator's station; an earth-working machine having a draft connection with said tractor; earth working means on said machine; adjusting mechanism for said earth working means; and manually operable selective control means for said mechanism supported adjacent said operator's station, including a plurality of control members having connecting stations formed therein, and operating means selectively engageable with said connecting stations; said connecting stations and said operating means being visible to the operator to facilitate manipulation thereof in controlling and operating said adjusting mechanism.

28. In a train of vehicles; a draft vehicle having an operator's station; a drawn vehicle having a draft connection with said draft vehicle; movable means on said drawn vehicle; adjusting mechanism for said movable means; and manually operable selective control means for said mechanism supported adjacent said operator's station, including a plurality of control members having connecting stations formed in the periphery thereof, and operating means selectively engageable with said connecting stations; said connecting stations and said operating means being visible to the operator to facilitate manipulation thereof in controlling and operating said adjusting mechanism.

29. In control mechanism of the class described, a rotatable hollow shaft, a second shaft rotatably mounted within said hollow shaft, a third shaft, means connecting said hollow shaft with said third shaft, mechanisms connected with said second and third shafts for operation thereby, a control member connected with each of said second and hollow shafts and adapted to be operated to effect rotation of said shafts, and means for operating said control members individually or together including a single operating member connectable with any one or all of said control members.

CARL A. GUSTAFSON.